P. REO.
METHOD OF SPLITTING GLASS ROLLERS OR CYLINDERS.
APPLICATION FILED MAY 23, 1917. RENEWED JAN. 28, 1918.
1,278,014.
Patented Sept. 3, 1918.
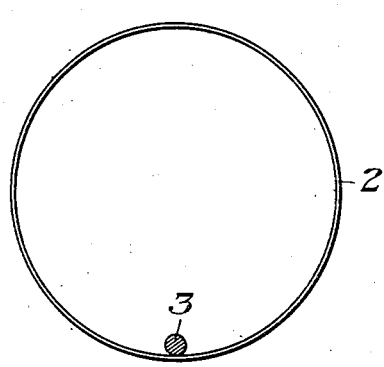
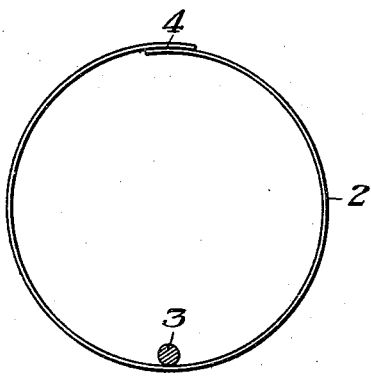
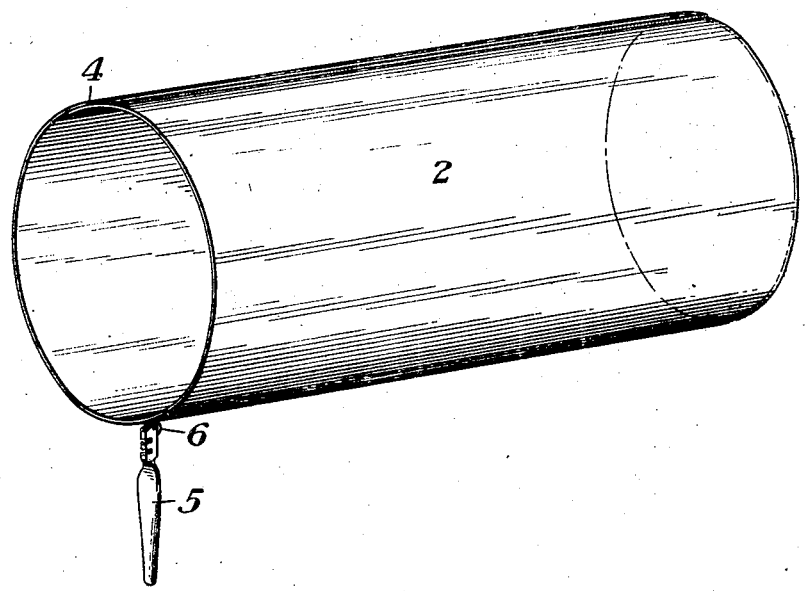

UNITED STATES PATENT OFFICE.

PETER REO, OF ARNOLD, PENNSYLVANIA, ASSIGNOR TO WINDOW GLASS MACHINE COMPANY, OF PITTSBURGH, PENNSYLVANIA, A CORPORATION OF NEW JERSEY.

METHOD OF SPLITTING GLASS ROLLERS OR CYLINDERS.

1,278,014.                Specification of Letters Patent.    Patented Sept. 3, 1918.

Application filed May 23, 1917, Serial No. 170,420. Renewed January 28, 1918. Serial No. 214,250.

*To all whom it may concern:*

Be it known that I, PETER REO, a subject of the King of Italy, residing at Arnold, Westmoreland county, Pennsylvania, have invented a new and useful Method of Splitting Glass Rollers or Cylinders, of which the following is a full, clear, and exact description, reference being had to the accompanying drawings, forming part of this specification, in which—

Figures 1 and 2 are end views showing a glass cylinder or roller at different stages of the operation; and Fig. 3 is a perspective view illustrating another step of the operation.

My invention has relation to a method of splitting glass rollers or cylinders, and has particular relation to the splitting of rollers or cylinders in the form of flattening lengths and preparatory to flattening. While the invention may be used in making the initial longitudinal split in the rollers, it is more particularly useful in making the subsequent cut or cuts which are necessary after the initial splitting in cutting the lengths into segments or "shawls." In cutting these segments or shawls, difficulty has heretofore been experienced in getting uniformly straight cuts. The method most commonly practised heretofore consists in running a heated splitting iron back and forth through the flattening length until a crack is started. These cracks do not, however, always run along straight lines and considerable loss of glass and breakage results.

I have discovered that this difficulty may be almost entirely overcome and uniformly straight splits or cracks obtained by heating the cylinder along the line of the desired split; and thereafter scoring the cylinder. In practice, I prefer to carry out the process by running the heated splitting iron through the flattening length for a considerably less period of time than has ordinarily been necessary, and then making an initial score on the outer surface of the glass directly opposite, and preferably at one end portion of the line of glass acted upon by the splitting iron.

In the drawings, I have shown one method of carrying out my invention, in which the flattening lengths or rollers 2 are placed on the usual splitting bucks, and the initial splits made in the usual manner by passing back and forth therethrough the usual splitting iron, such as indicated at 3 in Fig. 1. When the length has been thus split, it is rotated on the bucks through approximately 180 degrees to the position shown in Fig. 2, bringing the split side of the roller uppermost, the split edges being permitted to assume their usual overlapped relation, as indicated at 4. The splitting iron 3 is then run through the cylinder along the line of the next split, but only for about one-half the length of time required for the first splitting. A suitable scoring tool, such as the tool 5, having a small steel cutting wheel 6 is then used to score the cylinder on the outside directly opposite the line of glass which has been acted upon by the tool 3. By means of this tool a short score, say of about one inch in length, is made. The cylinder is then put under slight tension to cause the cut to run or is slightly jarred at the point where the score has been made. This causes the cylinder to split into two halves, or shawls, the split following the course covered by the heated iron.

In the case of larger cylinders which are to be cut into more than two segments or shawls, the extent to which the cylinders are rotated between the first and second splitting is, of course, varied.

I have above described the method of splitting cylinders by applying heat to the inner surface and then making a slight score on the outer surface of the cylinder, but the same result may be obtained by heating the outer surface, and slightly scoring the inner surface of the cylinder; and other changes may be made without departing from my invention.

My invention has greatly simplified and improved the operation of splitting these rollers, cylinders, or flattening lengths, and largely reduces the breakage and loss of glass.

I claim:

1. The herein described method of splitting glass cylinders, which consists in applying a heated splitting iron to the inside of the cylinder along the line of the split to be made, and then scoring the cylinder for a short distance along such line, substantially as described.

2. The herein described method of splitting glass cylinders, which consists in applying a heated splitting iron to the inside of the cylinder along the line of the split to be made, and then scoring the cylinder on its outer surface for a short distance along such line, substantially as described.

3. The herein described method of splitting glass cylinders, which consists in running a heated splitting iron through the cylinder along the line of the desired split, but to an extent insufficient to cause splitting, and then applying a scoring tool to the exterior of the cylinder at a point on the said line, substantially as described.

4. The method of splitting glass cylinders, consisting in heating the cylinder along the line of the desired split and then scoring the cylinder on said line, substantially as described.

5. The herein described method of splitting glass cylinders, which consists in initially splitting the cylinder longitudinally, then applying a splitting iron to the interior of the cylinder at another point where a subsequent split is to be made, withdrawing said iron before a split is produced, and then scoring the exterior surface of the cylinder along said line, substantially as described.

6. The method of resplitting a longitudinally split glass cylinder, which consists in passing a heated splitting iron along the cylinder along the line of the resplit, and then causing the cylinder to split along such line by applying a scoring tool to the cylinder at a point on said line, substantially as described.

In testimony whereof, I have hereunto set my hand.

PETER REO.